US009632568B2

(12) United States Patent
Nishikawa

(10) Patent No.: US 9,632,568 B2
(45) Date of Patent: Apr. 25, 2017

(54) SEMICONDUCTOR DEVICE, RADIO COMMUNICATION TERMINAL USING THE SAME, AND INTER-CIRCUIT COMMUNICATION SYSTEM

(71) Applicant: Renesas Electronics Corporation, Tokyo (JP)

(72) Inventor: Takuro Nishikawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 405 days.

(21) Appl. No.: 13/742,442

(22) Filed: Jan. 16, 2013

(65) Prior Publication Data

US 2013/0185574 A1 Jul. 18, 2013

(30) Foreign Application Priority Data

Jan. 18, 2012 (JP) .................................. 2012-007733

(51) Int. Cl.
*G06F 1/32* (2006.01)
*G06F 1/26* (2006.01)
*G06F 1/00* (2006.01)

(52) U.S. Cl.
CPC .......... *G06F 1/3296* (2013.01); *G06F 1/3287* (2013.01); *Y02B 60/1282* (2013.01)

(58) Field of Classification Search
None
See application file for complete search history.

(56) References Cited

U.S. PATENT DOCUMENTS

| 6,298,229 | B1* | 10/2001 | Tomlinson et al. ........ 455/404.2 |
| 6,408,196 | B2* | 6/2002 | Sheynblat et al. ............ 455/574 |
| 7,327,754 | B2* | 2/2008 | Mills ...................... H04L 12/12 370/419 |
| 8,656,242 | B2* | 2/2014 | Schmandt et al. ............ 714/748 |
| 2003/0188249 | A1* | 10/2003 | Park et al. ..................... 714/755 |
| 2005/0097380 | A1* | 5/2005 | Kim ............................. 713/323 |
| 2008/0242371 | A1* | 10/2008 | Chiba et al. .................. 455/574 |
| 2008/0247452 | A1* | 10/2008 | Lee ............................... 375/232 |
| 2009/0201271 | A1* | 8/2009 | Michiyasu et al. ........... 345/204 |

(Continued)

FOREIGN PATENT DOCUMENTS

JP 02-231959 A 9/1990
JP 8-166838 A 6/1996

(Continued)

OTHER PUBLICATIONS

Office Action for related Japanese Application No. 2012-007733, mailed Jun. 16, 2015.

(Continued)

*Primary Examiner* — Robert Cassity
(74) *Attorney, Agent, or Firm* — Shapiro, Gabor and Rosenberger, PLLC

(57) ABSTRACT

Disclosed as one aspect is a semiconductor device including a transmission/reception interface that is used for transmission and reception of data, a processing unit that processes the data, a monitoring unit that monitors received data and detects a specific frame allowed to be transmitted regardless of a state of a circuit to transmit/receive the data, and a power management unit that controls power consumption of a circuit including the processing unit.

13 Claims, 13 Drawing Sheets

(56) References Cited

U.S. PATENT DOCUMENTS

| | | | |
|---|---|---|---|
| 2009/0282277 A1* | 11/2009 | Sedarat | G06F 1/3209 |
| | | | 713/320 |
| 2010/0023788 A1* | 1/2010 | Scott et al. | 713/320 |
| 2010/0191992 A1* | 7/2010 | Shen | G06F 1/3215 |
| | | | 713/320 |
| 2010/0226481 A1* | 9/2010 | Tischer et al. | 379/37 |
| 2011/0124375 A1 | 5/2011 | Stuivenwold | |
| 2011/0289527 A1* | 11/2011 | Wei | 725/33 |
| 2012/0115430 A1* | 5/2012 | Hawkes et al. | 455/404.1 |
| 2013/0143609 A1* | 6/2013 | Richardson et al. | 455/466 |

FOREIGN PATENT DOCUMENTS

| | | |
|---|---|---|
| JP | 2008-262350 A | 10/2008 |
| JP | 2009-187396 A | 8/2009 |
| JP | 2011-519083 A | 6/2011 |

OTHER PUBLICATIONS

Office Action, issued Jan. 26, 2016, in Japanese Patent Application No. 2012-007733.

* cited by examiner

SEMICONDUCTOR DEVICE, RADIO COMMUNICATION TERMINAL USING THE SAME, AND INTER-CIRCUIT COMMUNICATION SYSTEM

CROSS-REFERENCE TO RELATED APPLICATIONS

This application is based upon and claims the benefit of priority from Japanese patent application No. 2012-007733, filed on Jan. 18, 2012, the disclosure of which is incorporated herein in its entirety by reference.

BACKGROUND

The present invention relates to a semiconductor device, a radio communication terminal using the same, and an inter-circuit communication system.

In information equipment such as a radio communication terminal, one system is composed of a combination of semiconductor devices or circuits with different functions. Therefore, in order to reduce the power consumption of equipment, it is necessary to control the operating mode of each circuit in consideration of the status of communication performed between the circuits.

Japanese Unexamined Patent Application Publication No. 8-166838 discloses a technique related to a communication terminal, in which at the time of detecting a request for communication from the outside, a startup determination unit of a power control unit determines the validity of the communication based on a prestored communication ID or the like and turns on the power only when it is valid. Further, Japanese Unexamined Patent Application Publication No. 2011-519083 discloses a technique that, in a system including a host processor and a coprocessor, activates the host processor in accordance with an activation signal that is output from the coprocessor.

SUMMARY

The inventors of the present invention have found out various problems during development of a semiconductor device. According to embodiments disclosed in the present invention, a semiconductor device suitable for a radio communication terminal or the like, for example, is provided. More detailed features are made obvious by the following description of the invention and the accompanying drawings.

One aspect of the present invention includes a semiconductor device including a transmission/reception interface that is used for transmission and reception of data, a monitoring unit that monitors received data, and a power management unit that controls power consumption of a circuit.

According to the present invention, it is possible to provide a high-quality semiconductor device that is suitable for a radio communication terminal or the like, for example.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Preferred embodiments of the present invention will be described in detail hereinafter with reference to the drawings. The present invention, however, is not limited to the below-described embodiments. The description hereinbelow is appropriately shortened and simplified to clarify the explanation.

<Overview of Radio Communication Terminal>

Figure 1A:
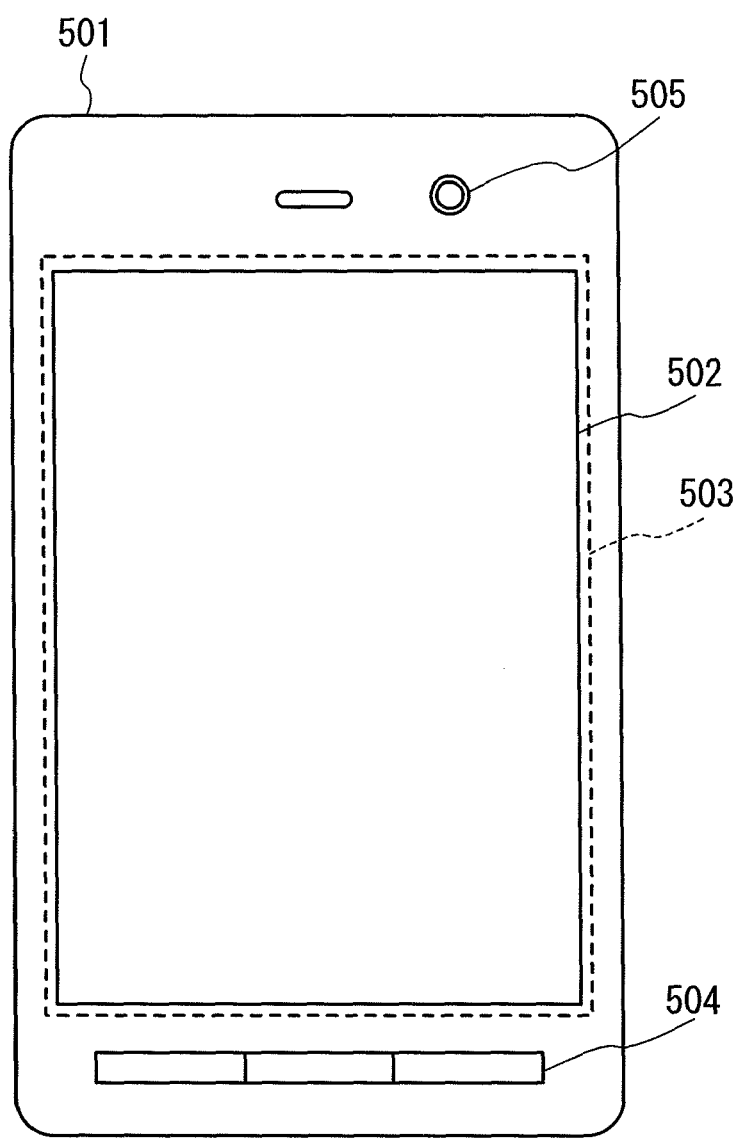
FIG. 1A is an outline view showing one example of a radio communication terminal to which the present invention is applied.
Figure 1B:
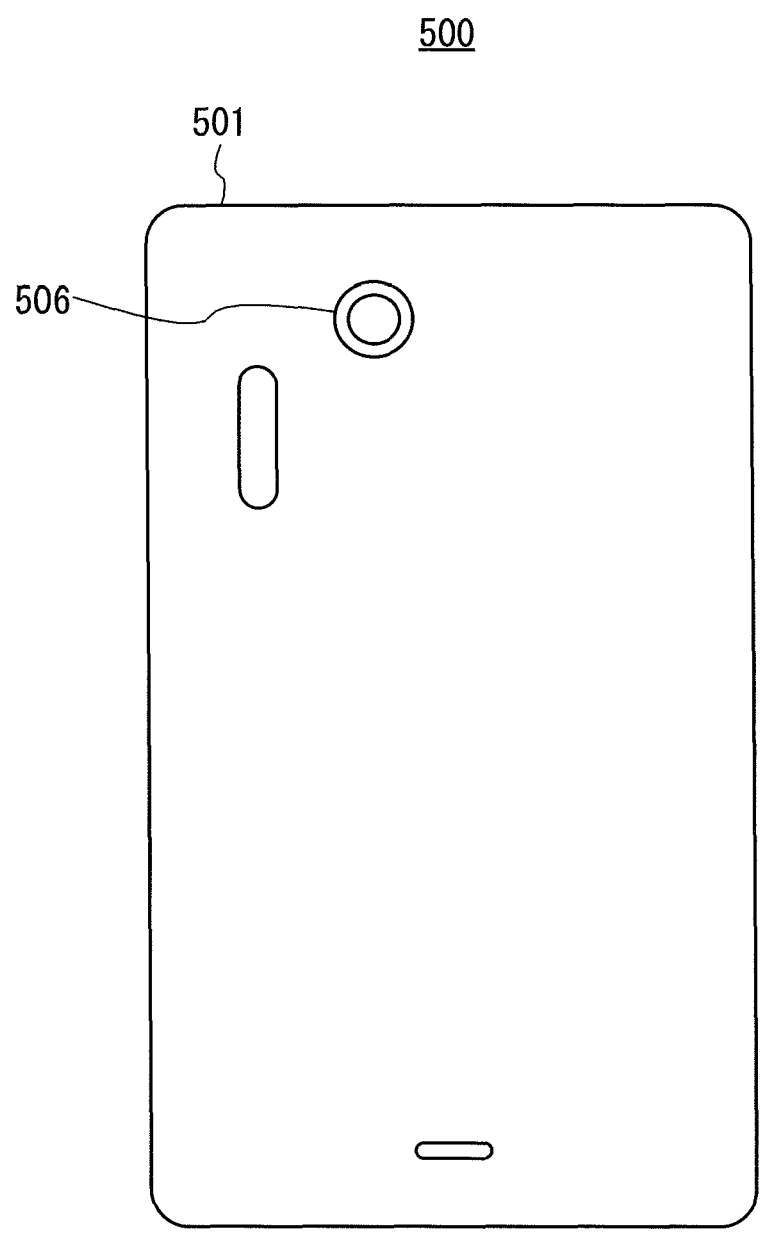
FIG. 1B is an outline view showing one example of a radio communication terminal to which the present invention is applied.

The overview of a radio communication terminal that is suitable for use as electronic equipment to which a semiconductor integrated circuit according to this embodiment is applied is described firstly with reference to FIGS. 1A and 1B. FIGS. 1A and 1B are outline views showing configuration examples of a radio communication terminal 500. Note that FIGS. 1A and 1B show the case where the radio communication terminal 500 is a smartphone. However, the radio communication terminal 500 may be another radio communication terminal such as a feature phone (for example, a folding mobile phone terminal), a portable game terminal, a tablet PC (Personal Computer) or a notebook PC. Further, the semiconductor integrated circuit according to this embodiment is applicable also to equipment other than the radio communication terminal as a matter of course.

FIG. 1A shows one principal surface (front surface) of a body 501 of the radio communication terminal 500. On the front surface of the body 501 is a display device 502, a touch panel 503, several operating buttons 504, and a camera device 505. On the other hand, FIG. 1B shows the other principal surface (back surface) of the body 501. On the back surface of the body 501 is a camera device 506.

The display device 502 is an LCD (Liquid Crystal Display), OLED (Organic Light-Emitting Diode) display or the like, and its display plane is mounted on the front surface of the body 501. The touch panel 503 is mounted to cover the display plane of the display device 502 or mounted on the backside of the display device 502 to detect a user's contact position on the display plane. Specifically, a user can intuitively manipulates the radio communication terminal 500 by touching the display plane of the display device 502 with a finger or a special pen (which is typically referred to a stylus). Further, the operating buttons 504 are used for auxiliary manipulation on the radio communication terminal 500. Note that such operating buttons are not mounted in some radio communication terminal.

The camera device 506 is a main camera that is mounted so that its lens unit is on the back surface of the body 501. On the other hand, the camera device 505 is a sub-camera mounted so that its lens unit is on the front surface of the body 501. Note that such a sub-camera is not mounted in some radio communication terminal.

Figure 2:
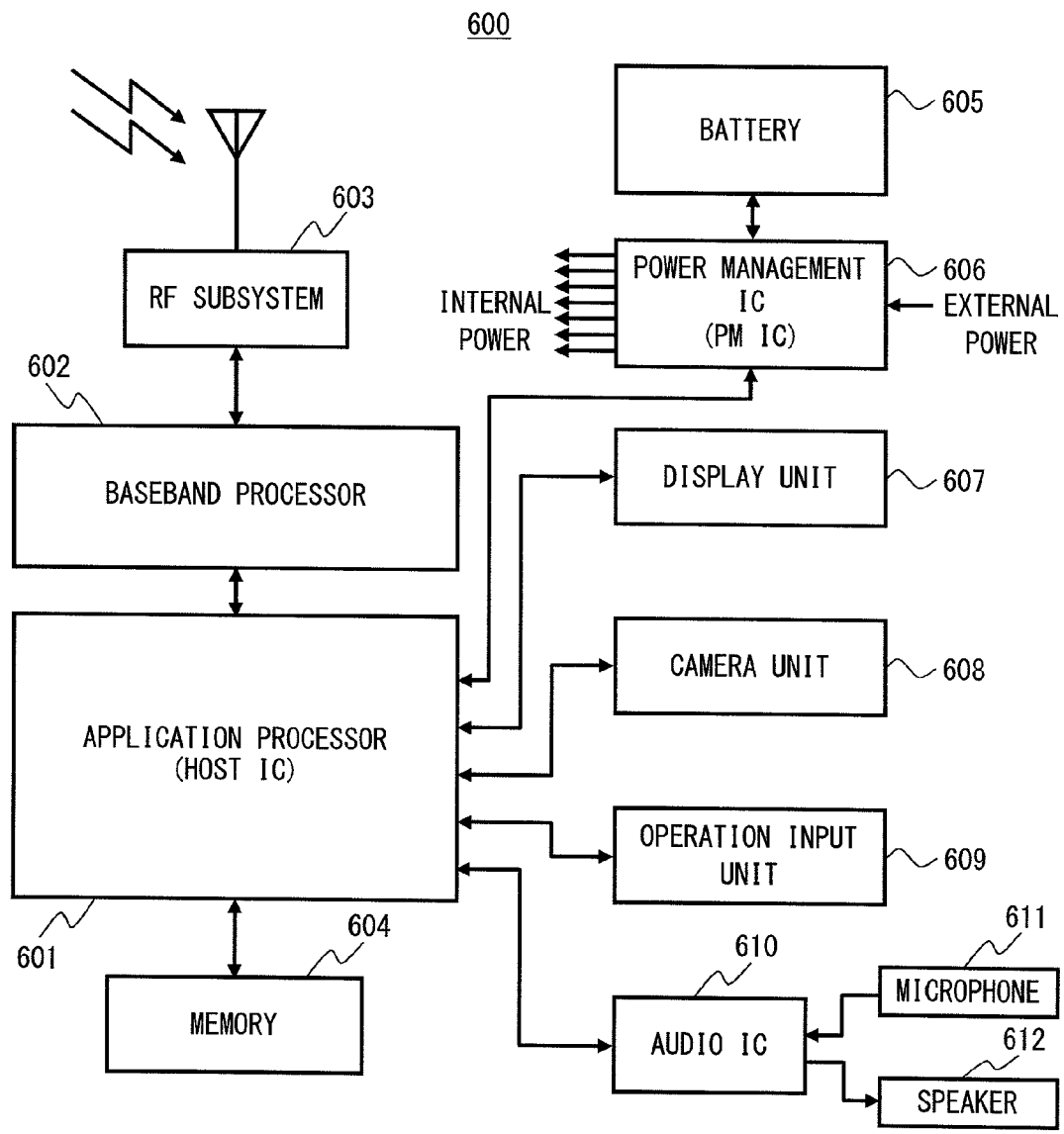
FIG. 2 is a block diagram showing a configuration example of a radio communication terminal to which the present invention is applied.

Next, the configuration of a mobile communication terminal 600 to which a semiconductor device according to the present invention is applied is described with reference to FIG. 2. FIG. 2 is a block diagram showing a configuration example of the mobile communication terminal 600 according to the first embodiment of the present invention. The mobile communication terminal 600 is incorporated into the radio communication terminal 500 shown in FIGS. 1A and 1B, for example. As shown in FIG. 2, the mobile communication terminal 600 includes an application processor 601, a baseband processor 602, an RF (Radio Frequency) subsystem 603, a memory 604, a battery 605, a power management IC (PMIC: Power Management Integrated Circuit) 606, a display unit 607, a camera unit 608, an operation input unit 609, an audio IC 610, a microphone 611, and a speaker 612.

The application processor 601 reads a program stored in the memory 604 and performs processing for implementing the functions of the mobile communication terminal 600. For example, the application processor 601 runs an OS (Operating System) program from the memory 604 and further runs an application program that operates on the basis of the OS program.

The baseband processor 602 performs baseband processing including encoding (error correction coding such as convolutional coding or turbo coding) or decoding of data transmitted and received by the mobile communication terminal. To be more specific, the baseband processor 602 receives transmission data from the application processor 601, encodes the received transmission data and transmits the data to the RF subsystem 603. Further, the baseband processor 602 receives received data from the RF subsystem 603, decodes the received data and transmits the data to the application processor 601.

The RF subsystem 603 performs modulation or demodulation of data transmitted and received by the mobile communication terminal 600. To be more specific, the RF subsystem 603 modulates the transmission data received from the baseband processor 602 by means of a carrier wave to generate a transmission signal and outputs the transmission signal through an antenna. Further, the RF subsystem 603 demodulates the received signal by means of a carrier wave to generate received data and transmits the received data to the baseband processor 602.

The memory 604 stores a program and data used by the application processor 601. Further, the memory 604 includes a nonvolatile memory in which stored data is maintained even when power is cut off and a volatile memory in which stored data is cleared when power is cut off.

The battery 605 is an electric battery and used in the case where the mobile communication terminal 600 operates not by external power. Note that the battery 605 may use the power of the battery 605 when an external power supply is connected as well. Further, it is preferred to use a secondary battery as the battery 605.

The power management IC 606 generates internal power from the battery 605 or the external power. The internal power is supplied to each block of the mobile communication terminal 600. At this time, the power management IC 606 controls the voltage of the internal power for each block to receive the internal power. The power management IC 606 makes voltage control of the internal power based on an instruction from the application processor 601. Further, the power management IC 606 can control the supply and cutoff of the internal power for each block. Furthermore, when there is external power supply, the power management IC 606 makes charge control of the battery 605 as well.

The display unit 607 is a liquid crystal display device, for example, and displays various images in accordance with processing in the application processor 601. The images displayed on the display unit 607 include a user interface image for a user to give an instruction for operation to the mobile communication terminal 600, a camera image, a moving image and the like.

The camera unit 608 acquires an image in accordance with an instruction from the application processor 601. The operation input unit 609 is a user interface to be operated by a user to give an instruction for operation to the mobile communication terminal 600. The audio IC 610 decodes audio data transmitted from the application processor 601 and drives the speaker 612 and further encodes audio information obtained from the microphone 611 to generate audio data and outputs the audio data to the application processor 601.

<Description of Configuration of Semiconductor Device According to First Embodiment>

Figure 3:
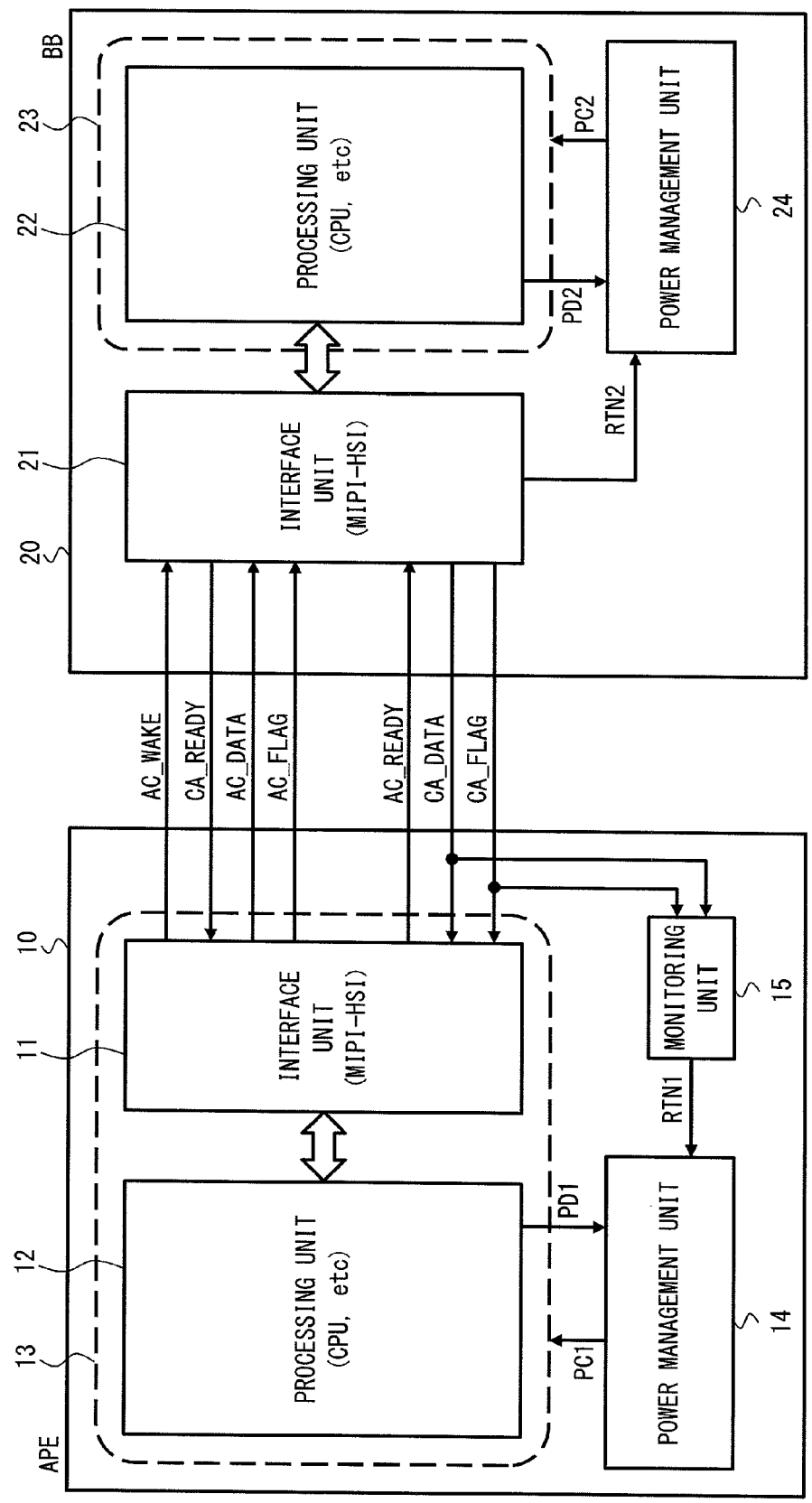
FIG. 3 is a block diagram showing an inter-circuit communication system including a semiconductor device according to a first embodiment.

A semiconductor device according to this embodiment is described hereinafter. FIG. 3 is a block diagram showing an inter-circuit communication system including a semiconductor device 10 according to the first embodiment. In FIG. 3, a semiconductor device 20 that communicates with the semiconductor device 10 according to the first embodiment is also shown. The semiconductor device 10 corresponds to a first circuit, and the semiconductor device 20 corresponds to a second circuit. Further, the semiconductor device 10 is an application processor (in the following description and drawings, "APE" is used as the reference symbol of the application processor), for example. The semiconductor device 20 is a baseband processor (in the following description and drawings, "BB" is used as the reference symbol of the baseband processor), for example.

As shown in FIG. 3, the semiconductor device 10 includes a transmission/reception interface (for example, an interface unit 11), a processing unit 12, a power management unit 14, and a monitoring unit 15. Further, the semiconductor device 10 has a power control region 13 including circuits whose power consumption is controlled.

In the inter-circuit communication system according to the first embodiment, the case of performing communication in compliance with the HSI (High-speed Synchronous Serial Interface) specification defined in the MIPI (Mobile Industry Processor Interface) Alliance (which is referred to hereinafter as MIPI HSI) is described in the following example; however, the below-described technical idea is not limited to the HSI specification and is applicable to all communication methods to which the technical idea derived from the description is applied.

The interface unit 11 performs processing to transmit and receive data with an interface unit 21. To be more specific, data to be transmitted is supplied from the processing unit 12 to the interface unit 11, and the interface unit 11 transmits the supplied data to the semiconductor device 20. Further, when the interface unit 11 receives data output from the semiconductor device 20, the interface unit 11 supplies the data to the processing unit 12.

Further, when transmitting data to the semiconductor device 20, the interface unit 11 enables a wakeup signal AC_WAKE to wake up the semiconductor device 20 from the sleep mode. Further, the interface unit 11 outputs a transmission permission signal AC_READY indicating whether the device is ready to receive data to the semiconductor device 20. The transmission permission signal AC_READY is in the enable state (for example, 1) when there is a free space in an input buffer of the interface unit 11, and in the disable state (for example, 0) when there is some reason for not being able to receive data, such as when the interface unit 11 is in the low power consumption mode or when there is no free space in the input buffer.

Further, the interface unit 11 transmits one data using two signals: a data signal AC_DATA and a flag signal AC_FLAG. The flag signal AC_FLAG has a value to generate a clock signal as a result of the exclusive OR operation with the value of the data signal.

The processing unit 12 processes various data in the semiconductor device 10. As one of data processing, when the interface unit 11 outputs a sleep permission notification in response to receiving a sleep permission frame that allows transition to the stop mode as data, the processing unit 12 according to the first embodiment outputs (enables) a power down control signal PD1 in response to the sleep permission signal. Note that, when the transmission of data through the interface unit 11 is not completed, the processing unit 12 stops the output of the power down control signal PD1 (for example, maintains the disable state).

The power management unit 14 controls whether the circuit included in a power control region 13 operates with first consumption power or operates with second consumption power which is lower than the first consumption power. Note that the power management unit 14 switches the consumption power of the circuit belonging to the power control region 13 by making control such as cutting off the power of the circuit belonging to the power control region 13 or changing or stopping a clock frequency to be supplied. In the following description, it is assumed that the power management unit 14 controls the consumption power by switching between the cutoff and supply of the power to the power control region 13.

The operation of the power management unit 14 is described hereinafter in further detail. The power management unit 14 switches the consumption power of the processing unit 12 and the interface unit 11 from the first consumption power to the second consumption power upon output of the power down control signal PD1 (for example, when it becomes enabled). Then, the power management unit 14 switches a circuit at least including the processing unit from a second operating mode where it operates with the second consumption power to a first operating mode where it operates with the first consumption power in response to a first return instruction signal RTN1. When switching the consumption power of the power control region 13 from the first consumption power to the second consumption power, the power management unit 14 enables a power control signal PC1, and, when switching it from the second consumption power to the first consumption power, the power management unit 14 disables a power control signal PC1

The monitoring unit 15 detects a specific frame that is allowed to be transmitted regardless of the state of a circuit to transmit/receive the data, and outputs the first return instruction signal RTN1 to the power management unit 14 in accordance with the detected result. In the semiconductor device 10 according to the first embodiment, a break transmission command that is defined by the MIPI HSI is used as the specific frame. The monitoring unit 15 is described in detail later.

Further, in the block diagram of FIG. 3, the semiconductor device 20 that communicates with the semiconductor device 10 is also shown. The semiconductor device 20 includes an interface unit 21, a processing unit 22, and a power management unit 24. Further, the semiconductor device 20 has a power control region 23 where consumption power is controlled.

The interface unit 21 is a circuit having substantially the same configuration as the interface unit 11, and it outputs a transmission permission signal CA_READY, a data signal CA_DATA and a flag signal CA_FLAG that correspond to the transmission permission signal AC_READY, the data signal AC_DATA and the flag signal AC_FLAG, respectively. Further, when the wakeup signal AC_WAKE that is output from the interface unit 11 is enabled, the interface unit 21 outputs a return instruction signal RTN2 to the power management unit 24. Note that the interface unit 21 does not output a wakeup signal CA_WAKE that corresponds to the wakeup signal AC_WAKE that is output from the interface unit 11. This is because the semiconductor device 10 has a configuration that can return from the sleep mode without use of the wakeup signal. However, even if the interface unit 21 outputs the wakeup signal CA_WAKE, the interface unit 11 can just ignore it and thus no particular problem is caused in this embodiment.

The processing unit 22 processes various data in the semiconductor device 20. As one of data processing, when the interface unit 21 outputs the sleep permission notification in response to receiving the sleep permission frame that allows transition to the stop mode as data, the processing unit 22 according to the first embodiment outputs (enables) a power down control signal PD2 in response to the sleep permission signal. Note that, when the transmission of data through the interface unit 21 is not completed, the processing unit 22 stops the output of the power down control signal PD2 (for example, maintains the disable state). Further, when a sleep return signal is supplied from the interface unit 21, the processing unit 22 disables the power down control signal PD2.

The power management unit 24 controls whether the circuit included in the power control region 23 operates with first consumption power or operates with second consumption power which is lower than the first consumption power. Note that the power management unit 24 switches the consumption power of the circuit belonging to the power control region 23 by making control such as cutting off the power of the circuit belonging to the power control region 23 or changing or stopping a clock frequency to be supplied. In the following description, it is assumed that the power management unit 24 controls the consumption power by switching between the cutoff and supply of the power to the power control region 23.

The operation of the power management unit 24 is described hereinafter in further detail. The power management unit 24 switches the consumption power of the processing unit 22 from the first consumption power to the second consumption power in response that the power down control signal PD2 becomes enabled. Then, the power management unit 24 switches the consumption power of the power control region 23 from the second consumption power to the first consumption power in response that the power down control signal PD2 becomes disabled or the return instruction signal RTN2 is enabled. When switching the consumption power of the power control region 23 from the first consumption power to the second consumption power, the power management unit 24 enables a power control signal PC2, and, when switching it from the second consumption power to the first consumption power, the power management unit 24 disables a power control signal PC2.

<Detailed Description of Monitoring Unit>

Figure 4:
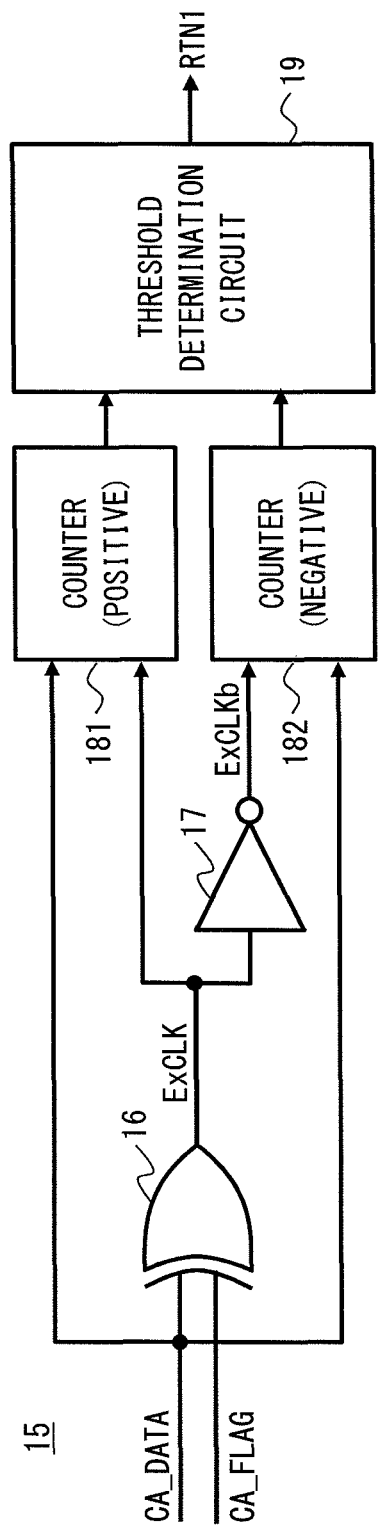
FIG. 4 is a circuit diagram of a monitoring unit according to the first embodiment.

The monitoring unit 15 is described hereinafter in detail. FIG. 4 is a detailed block diagram of the monitoring unit 15. As shown in FIG. 4, the monitoring unit 15 includes an ExOR circuit 16, an inverter 17, counters 181 and 182, and a threshold determination circuit 19.

The ExOR circuit 16 calculates the exclusive OR of the data signal CA_DATA and the flag signal CA_FLAG and generates a clock signal ExCLK. The inverter 17 inverts the clock signal ExCLK and generates a clock signal ExCLKb. The counter 181 counts up the count value if the data signal CA_DATA is Low level each time the rising edge of the clock signal ExCLK is input. The counter 182 counts up the count value if the data signal CA_DATA is Low level each time the rising edge of the clock signal ExCLKb is input. The threshold determination circuit 19 enables the return instruction signal RTN1 (set it to High level, for example) in response that the total of the count value of the counter 181 and the count value of the counter 182 reaches a predetermined threshold.

Note that the counters 181 and 182 reset the count values when the return instruction signal RTN1 becomes enabled or the High-level data signal CA_DATA is input.

Figure 5:
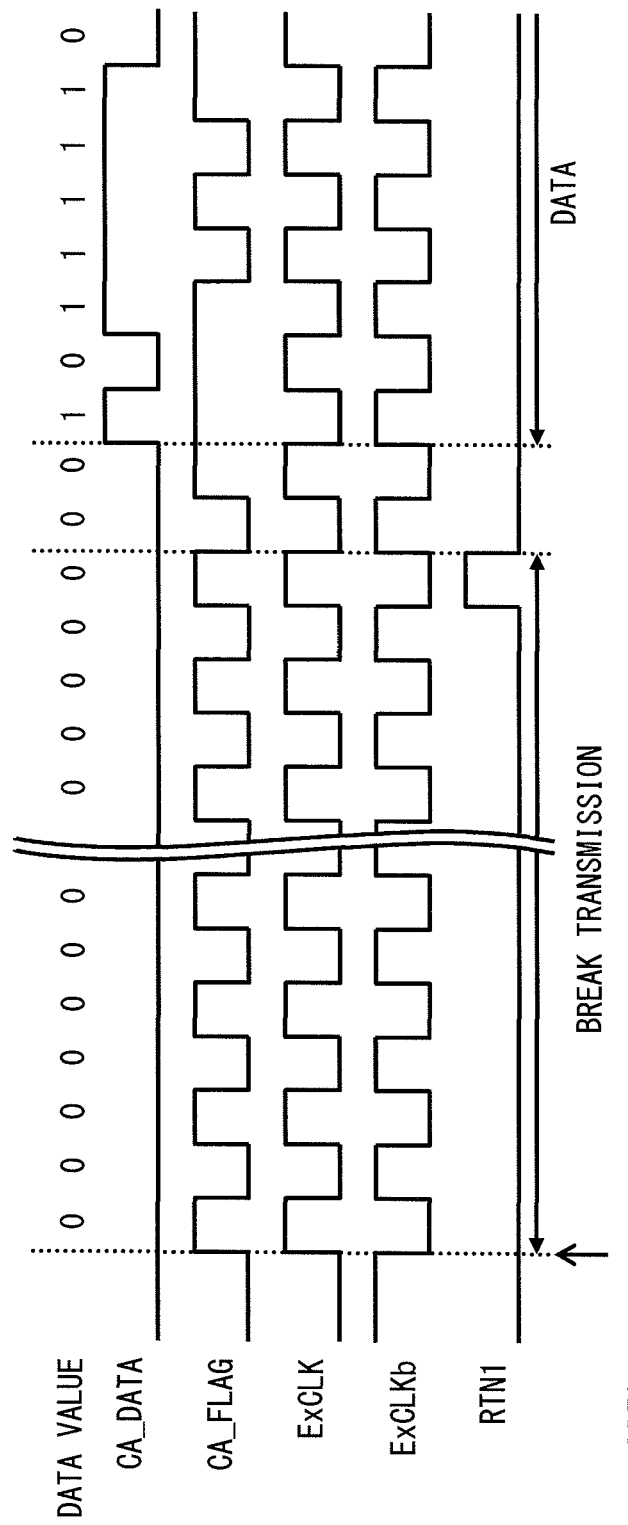
FIG. 5 is a timing chart showing an operation of the monitoring unit according to the first embodiment.

In the above configuration, the monitoring unit 15 determines the period where the same value continues as the data signal CA_DATA based on the clock signal ExCLK and thereby detects the specific frame. The operation of the monitoring unit 15 shown in FIG. 4 is described in detail. FIG. 5 is a timing chart showing the operation of the monitoring unit 15. As shown in FIG. 5, the data signal CA_DATA is data transmitted from the semiconductor device 20 to the semiconductor device 10. The flag signal CA_FLAG is a signal having a value to generate a clock signal as a result of the exclusive OR operation with the data signal CA_DATA. Further, the simultaneous change in the logic level of the flag signal CA_FLAG and the data signal CA_DATA is inhibited.

Then, in the monitoring unit 15, the ExOR circuit 16 generates the clock signal ExCLK based on the data signal CA_DATA and the flag signal CA_FLAG. Further, the inverter 17 generates the clock signal ExCLKb, which is an inverted signal of the clock signal ExCLK.

Then, when a break transmission command is transmitted as the data signal CA_DATA, Low level (for example, 0) continues for a longer period than the data length transmitted as the data signal CA_DATA. Therefore, in the case where a threshold that is preset for detecting the break transmission command is 33, for example, the monitoring unit 15 enables the return instruction signal RTN1 (to 1, for example) at the point when Low level continues 33 times in sequence. Note that, although two bits of 0 are transmitted between the break transmission command and the data in the example of FIG. 5, 0 between the break transmission command and the data is ignored in the receiving circuit (for example, the semiconductor device 10).

Further, as shown in FIG. 5, when normal data is transmitted as the data signal CA_DATA, Low level does not continue 33 times in sequence. Therefore, the monitoring unit 15 does not enable the return instruction signal RTN1 for the normal data. The normal data has a rule that the head of the data is always 1 and has a data length of 32 bits.

Note that the break transmission command is a signal to be used for correcting the lack of data synchronization when the synchronization of data is lost in the MIPI HSI, and it is a signal that is allowed to be transmitted even when the transmission permission signal CA_READY is disabled. In the semiconductor device 10 according to this embodiment, the case where the break transmission command is detected in the monitoring unit 15 and thereby enable the return instruction signal RTN1 is described as an example. However, the signal detected by the monitoring unit 15 is not limited to the break transmission command but may be any signals received as the data signal CA_DATA as long as it is distinguishable from normal data and it is a command or the like that is designed to be used for another purpose.

<Description of Operation of Semiconductor Device According to First Embodiment>

Figure 6:
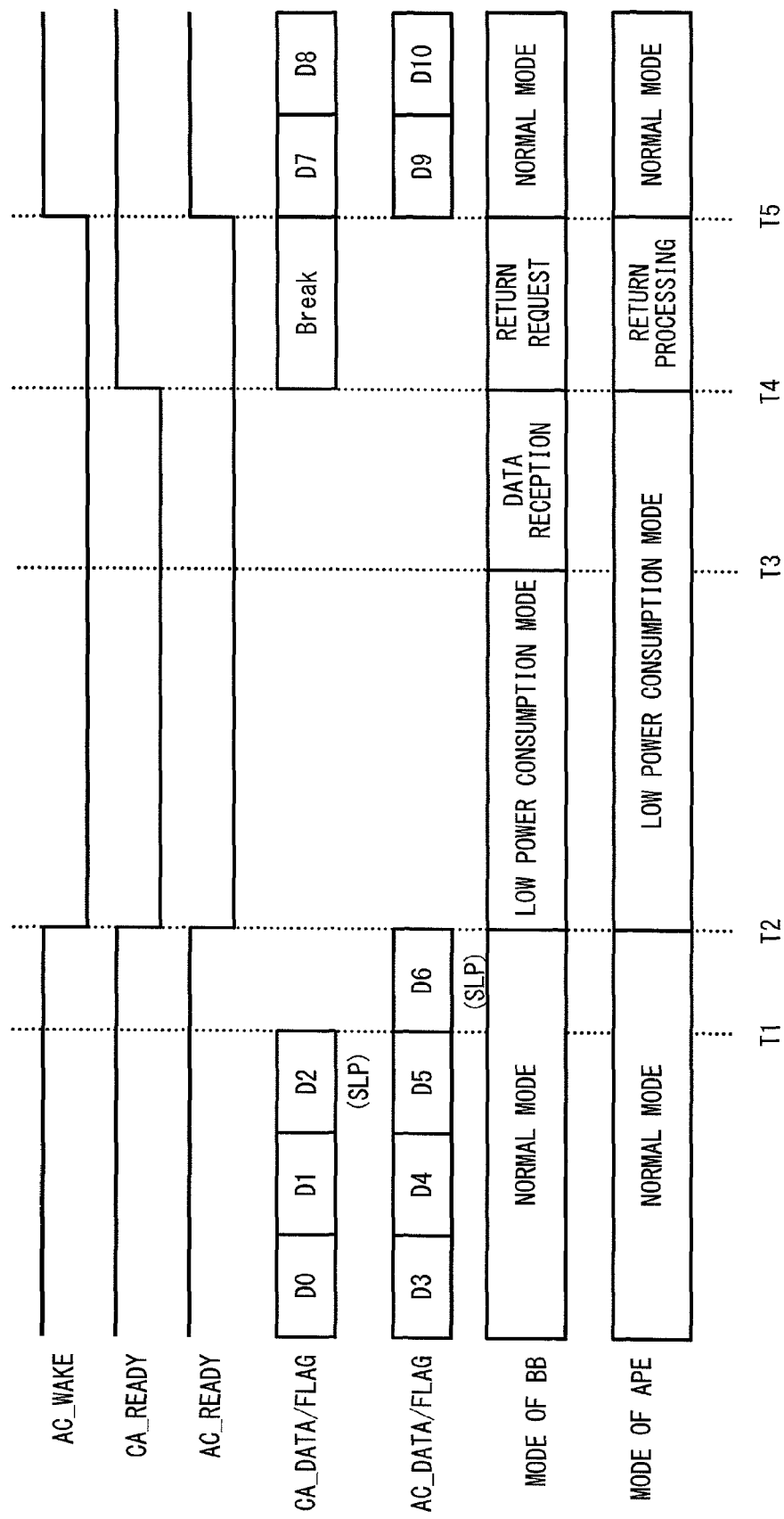
FIG. 6 is a timing chart showing an operation of the inter-circuit communication system including the semiconductor device according to the first embodiment.

The operation in the inter-circuit communication system shown in FIG. 3 is described hereinafter. FIG. 6 is a timing chart showing the operation of the inter-circuit communication system including the semiconductor device 10 according to the first embodiment.

In the example shown in FIG. 6, during the period before timing T1, data communication is performed between the semiconductor device 10 and the semiconductor device 20. At this time, the semiconductor device 20 is in the normal operating mode where the wakeup signal AC_WAKE is enabled (for example, High level) and the transmission permission signal AC_READY is enabled (for example, High level), and the circuit belonging to the power control region 23 is in the operating mode. Further, the semiconductor device 10 is in the normal operating mode where the transmission permission signal CA_READY is enabled (for example, High level), and the circuit belonging to the power control region 13 is in the operating mode.

Then at timing T1, the semiconductor device 10 receives a sleep permission frame SLP as data D2. Consequently, in the semiconductor device 10, the interface unit 11 outputs a sleep permission notification to the processing unit 12; however, because the data transmission through the interface unit 11 is not completed, the processing unit 12 maintains the disable state of the power down control signal PD1.

Then, during the period from timing T1 to timing T2, the semiconductor device 10 transmits the sleep permission frame SLP upon completion of the data transmission. At timing T2, the processing unit 12 of the semiconductor device 10 recognizes the completion of data transmission and, because the sleep permission notification is already received, enables the power down control signal PD1. Consequently, in the semiconductor device 10, the power management unit 14 enables the power control signal PC1 and cuts off the power to the power control region 13. Then, the semiconductor device 10 transitions from the normal operating mode (the mode of operating with the first consumption power, for example) to the low power consumption mode (the mode of operating with the second consumption power, for example). At this time, the semiconductor device 10 disables the transmission permission signal CA_READY.

Further, at timing T2, the semiconductor device 20 receives a sleep permission frame from the semiconductor device 10. Then, in the semiconductor device 20, the interface unit 21 outputs a sleep permission notification to the processing unit 22, and enables the power down control signal PD2. Consequently, in the semiconductor device 20, the power management unit 24 enables the power control signal PC2 and cuts off the power to the power control region 23, and thereby the semiconductor device 20 transitions from the normal operating mode (the mode of operating with the first consumption power, for example) to the low power consumption mode (the mode of operating with the second consumption power, for example). At this time, the semiconductor device 20 disables the wakeup signal AC_WAKE and the transmission permission signal CA_READY.

Then, at timing T3, the semiconductor device 20 returns from the low power consumption mode upon receiving data from an RF subsystem, for example. At timing T4, the semiconductor device 20 transmits the break transmission command as a return request. At this time, the semiconductor device 20 enables the transmission permission signal CA_READY.

Further, at timing T4, in the semiconductor device 10 that has received the break transmission command, the monitoring unit 15 enables the return instruction signal RTN1, and the power management unit 14 disables the power control signal PC1. The semiconductor device 10 thereby transitions from the low power consumption mode to the normal mode.

Then, at timing T5, the semiconductor device 10 enables the wakeup signal AC_WAKE and the transmission permission signal AC_READY and starts data transmission. Further, at timing T5, the semiconductor device 20 starts data transmission in response that the transmission permission signal AC_READY becomes enabled.

Description of Comparative Example

Figure 7:
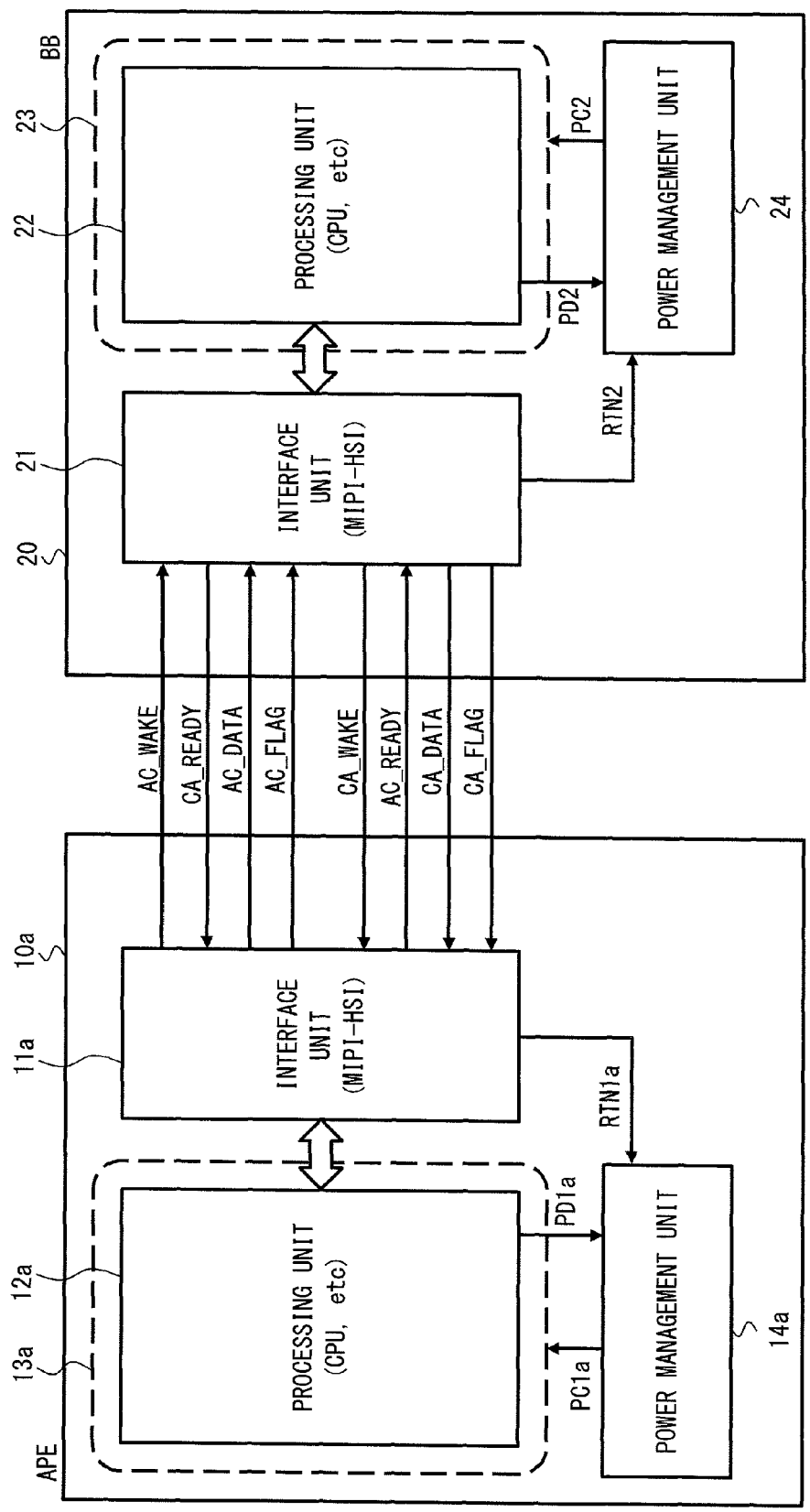
FIG. 7 is a block diagram showing an inter-circuit communication system including a semiconductor device according to a comparative example.

A comparative example that has been studied by the present inventors is described hereinbelow. FIG. 7 is a block diagram of an inter-circuit communication system according to the comparative example. The inter-circuit communication system according to the comparative example shown in FIG. 7 includes a semiconductor device 10a in place of the semiconductor device 10. The semiconductor device 10a includes an interface unit 11a, a processing unit 12a, and a power management unit 14a. Further, the semiconductor device 10a has a power control region 13a where power consumption is controlled.

The interface unit 11a is a circuit block that corresponds to the interface unit 21, the processing unit 12a implements the functions of the semiconductor device 10a, and the power management unit 14a is a circuit block that corresponds to the power management unit 24. Further, the power control region 13a includes the processing unit 12a and does not include the interface unit 11a. This is because the semiconductor device 10 starts the receiving operation based on the wakeup signal CA_WAKE that is output from the semiconductor device 20 and thus the interface unit 11a cannot enter the sleep mode.

Note that the processing unit 12a enables a power down control signal PD1a based on an instruction from the interface unit 11a, and the power management unit 14a enables a power control signal PC1a in response that the power down control signal PD1a becomes enabled. Further, the interface unit 11a enables a return instruction signal RTN1a in response that the wakeup signal CA_WAKE becomes enabled. Further, the power management unit 14a disables the power control signal PC1a in response that the return instruction signal RTN1a becomes enabled.

In the inter-circuit communication system according to this comparative example, the processing unit 12a of the semiconductor device 10a can transition to the sleep mode at the end of communication; however, because it needs to wait for the wakeup signal CA_WAKE from the semiconductor device 20 to return to the normal mode from the sleep mode, the interface unit 11a cannot transition to the sleep mode. Further, in the inter-circuit communication system according to this comparative example, it is necessary to include a terminal and a signal path for transmitting the wakeup signal CA_WAKE that is used for return processing, which causes an increase in the number of terminals and the substrate area required for implementation.

<Advantage of Semiconductor Device According to First Embodiment>

As described above, the semiconductor device 10 according to the first embodiment includes the monitoring unit 15 and the power management unit 14 that controls the operating mode of the power control region 13 based on the return instruction signal RTN1 that is output from the monitoring unit 15. When the return instruction signal RTN1 becomes enabled, the power management unit 14 switches the power control region 13 from the mode of operating with the second consumption power to the mode of operating with the first consumption power which is higher than the second consumption power.

Accordingly, the semiconductor device 10 can return from the low power consumption mode without receiving the wakeup signal CA_WAKE from the semiconductor device 20. Thus, with use of the semiconductor device 10, the semiconductor device 10 can reduce the number of signals that are used for the transition to and return from the low power consumption mode.

Further, in the semiconductor device 10, there is no need to keep the interface unit 11 in the operating mode in order to monitor the state of the wakeup signal CA_WAKE that is used for the return. Therefore, the semiconductor device 10 can reduce the power consumption of the interface unit 11 during the period of operating with the second consumption power with the lower power consumption.

Further, in the semiconductor device 10, the break transmission command that is used for another purpose in terms of specification is used as the signal to be used to cause the operating mode to return to the normal operating mode. Therefore, with use of the semiconductor device 10, there is no need to prepare a command to be used to allow the operating mode to return. It is thereby possible to maintain compatibility with the semiconductor device capable of operating in compliance with the specification.

Further, although, in the semiconductor device 10, the monitoring unit 15 is used for detecting the break transmission command, the monitoring unit 15 can be composed of a very simple circuit as shown in FIG. 4. Thus, the semiconductor device 10 can avoid a significant increase in circuit scale with the addition of the monitoring unit 15. Further, because the monitoring unit 15 operates based on the clock signal ExCLK that is generated on the basis of the data signal CA_DATA and the flag signal CA_FLAG, the clock signal ExCLK is not generated during the period with no data transmission and reception, thus not consuming power. Because the power consumption in the monitoring unit 15 is only during the period with data transmission and reception, the semiconductor device 10 can further reduce the power consumption in the low power consumption mode.

Second Embodiment

Figure 8:
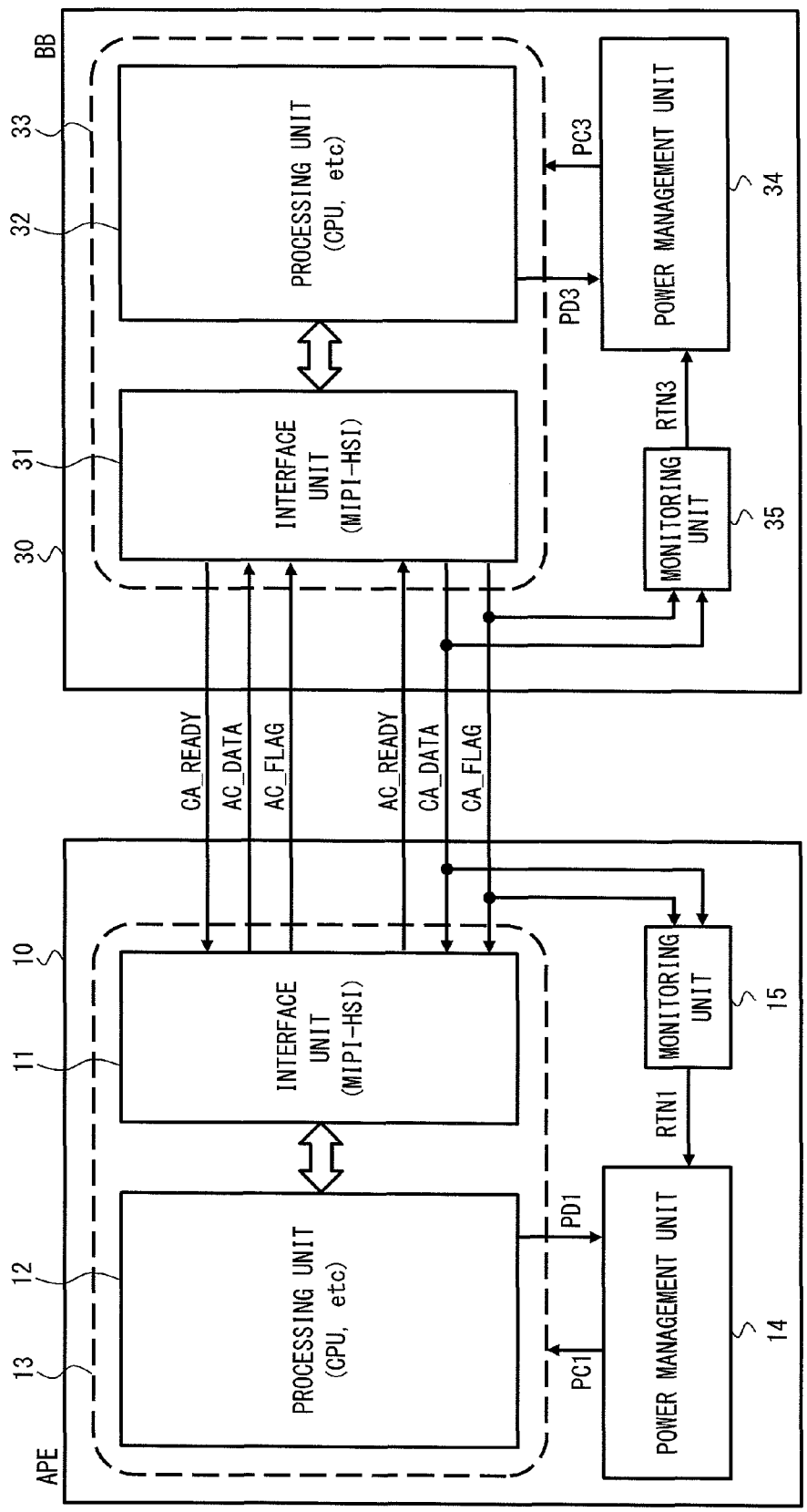
FIG. 8 is a block diagram showing an inter-circuit communication system including a semiconductor device according to a second embodiment.

Description of Configuration of Semiconductor Device According to Second Embodiment FIG. 8 is a block diagram showing an inter-circuit communication system including a semiconductor device according to the second embodiment. As shown in FIG. 8, in the inter-circuit communication system according to the second embodiment, each of two semiconductor devices that communicate with each other includes a monitoring unit that monitors a specific frame (for example, break transmission).

In the example shown in FIG. 8, the inter-circuit communication system according to the second embodiment includes a semiconductor device 30 in place of the semiconductor device 20 shown in FIG. 3. The semiconductor device 30 includes an interface unit 31, a processing unit 32, a power management unit 34, and a monitoring unit 35. Further, the semiconductor device 30 has a power control region 33 that includes the interface unit 31 and the processing unit 32.

The interface unit 31 corresponds to the interface unit 11, the processing unit 32 corresponds to the processing unit 12, the power management unit 34 corresponds to the power management unit 14, and the monitoring unit 35 corresponds to the monitoring unit 15, and therefore the detailed description of each unit is omitted. Note that the power management unit 34 enables a power control signal PC3 in response that a power down control signal PD3 that is output from the processing unit 32 becomes enabled, thereby cutting off the power of the circuit belonging to the power control region 33. Further, the power management unit 34 disables the power control signal PC3 in response that a return instruction signal RTN3 that is output from the monitoring unit 35 becomes enabled, thereby allowing the power of the power control region 33 to return.

<Description of Operation of Semiconductor Device According to Second Embodiment>

Figure 9:
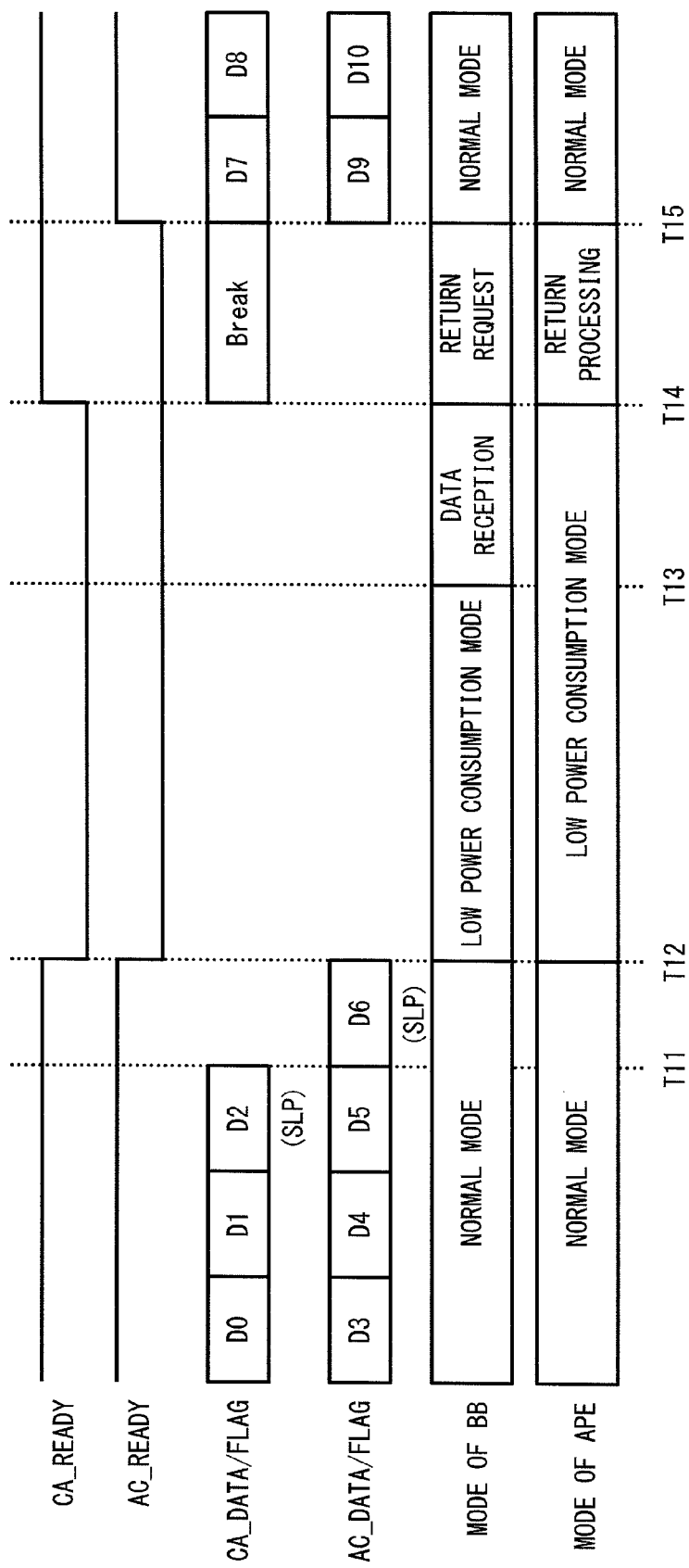
FIG. 9 is a timing chart showing an operation of the inter-circuit communication system including the semiconductor device according to the second embodiment.

In the inter-circuit communication system according to the second embodiment, each of the semiconductor devices that communicate with each other includes the monitoring unit and thereby perform processing to allow the power of the power control region to return without use of the wakeup signal AC_WAKE and the wakeup signal CA_WAKE. FIG. 9 is a timing chart showing the operation of the inter-circuit communication system according to the second embodiment.

The timing chart of FIG. 9 shows the case where the same operation as the operation of the inter-circuit communication system according to the first embodiment shown in FIG. 6 is performed using the inter-circuit communication system according to the second embodiment. As show in FIG. 9, in the inter-circuit communication system according to the second embodiment, the semiconductor device 10 and the semiconductor device 30 communicate with each other without use of the wakeup signal AC_WAKE. Note that, although not shown in FIG. 9, when a break transmission command is transmitted from the semiconductor device 10 to the semiconductor device 30, the monitoring unit 35 detects the break transmission command and enables the return instruction signal RTN3. In response that the return instruction signal RTN3 becomes enabled, the power management unit 34 disables the power control signal PC3, thereby allowing the power of the power control region 33 to return.

<Advantage of Semiconductor Device According to Second Embodiment>

As described above, with use of the inter-circuit communication system according to the second embodiment, the semiconductor device 30 can return from the low power consumption mode without use of the wakeup signal AC_WAKE. Thus, the inter-circuit communication system according to the second embodiment can perform the same operation as the inter-circuit communication system according to the first embodiment, reducing the number of lines between the semiconductor device 10 and the semiconductor device 30.

Third Embodiment

Figure 10:
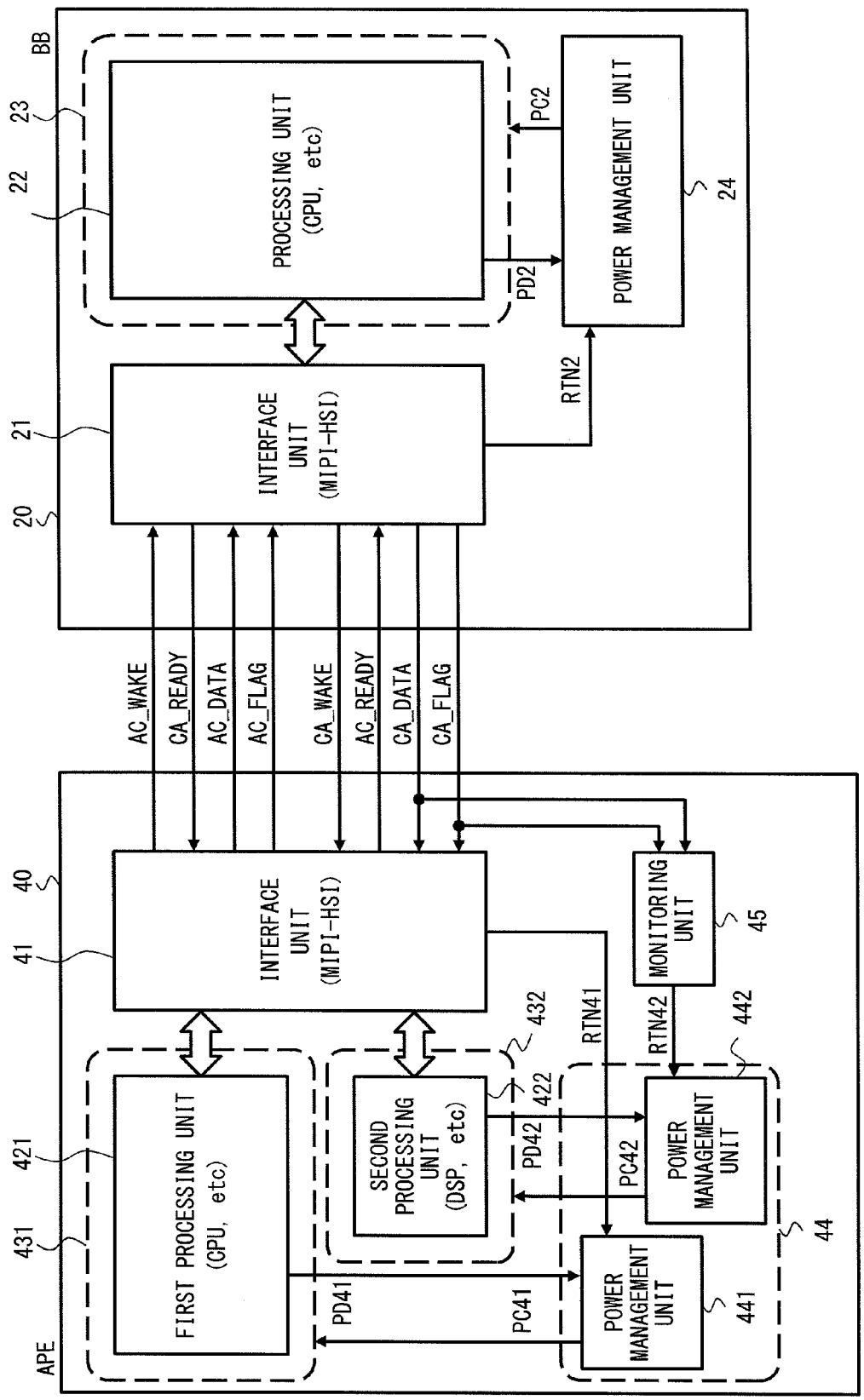
FIG. 10 is a block diagram showing an inter-circuit communication system including a semiconductor device according to a third embodiment.

Description of Configuration of Semiconductor Device According to Third Embodiment FIG. 10 is a block diagram showing an inter-circuit communication system including a semiconductor device 40 according to the third embodiment. As shown in FIG. 10, the inter-circuit communication system according to the third embodiment includes the first circuit (for example, the semiconductor device 40) that communicates with the second circuit (for example, the semiconductor device 20) described in the first embodiment. The semiconductor device 40 is a semiconductor device capable of selecting a circuit block to be returned in accordance with a received signal or command. Thus, the inter-circuit communication system according to the third embodiment includes the semiconductor device 20 according to the first embodiment and the semiconductor device 40 having a new function, and therefore the semiconductor device 40 is particularly described hereinbelow.

The semiconductor device 40 includes an interface unit 41, a first processing unit 421, a second processing unit 422, a power management unit 44, and a monitoring unit 45. Further, the semiconductor device 40 has a power control region 431 including the first processing unit 421 as a first power control region, and has a power control region 432 including the second processing unit 422 as a second power control region.

The interface unit 41 is a communication interface for transmitting and receiving data. To be more specific, the interface unit 41 transmits data signal AC_DATA and flag signal AC_FLAG as transmission data, and receives data signal CA_DATA and flag signal CA_FLAG as received data. Then, the interface unit 41 supplies the received data to the first processing unit 421 or the second processing unit 422. Further, the interface unit 41 generates the transmission data based on data supplied from the first processing unit 421 or the second processing unit 422.

Further, the interface unit 41 enables the transmission permission signal AC_READY when it is ready to receive data. The interface unit 41 transmits the transmission data during the period when the transmission permission signal CA_READY that is output from the semiconductor device 20 is enabled.

Further, when it becomes necessary to transmit data to the semiconductor device 20, the interface unit 41 enables the wakeup signal AC_WAKE. Furthermore, when the wakeup signal CA_WAKE that is output from the semiconductor device 20 is enabled, the interface unit 41 enables a second return instruction signal RTN41 and, when the wakeup signal CA_WAKE is disabled, the interface unit 41 disables the second return instruction signal RTN41.

The first processing unit 421 includes a CPU, for example, and implements some of the functions of the semiconductor device 40. The second processing unit 422 includes a DSP (Digital Signal Processor), for example, and implements some of the functions of the semiconductor device 40. It is assumed that the power consumption during operation of the second processing unit 422 is lower than that of the first processing unit 421.

Further, as one of data processing, when the interface unit 41 outputs a sleep permission notification in response to receiving a sleep permission frame that allows transition to the stop mode as data, the first processing unit 421 outputs a power down control signal PD41 in response to the sleep permission signal. Note that, when the transmission of data through the interface unit 41 is not completed, the first processing unit 421 stops the output of the power down control signal PD41.

Further, as one of data processing, when the interface unit 41 outputs a sleep permission notification in response to receiving a sleep permission frame that allows transition to the stop mode as data, the second processing unit 422 outputs a power down control signal PD42 in response to the sleep permission signal. Note that, when the transmission of data through the interface unit 41 is not completed, the second processing unit 422 stops the output of the power down control signal PD42.

The power management unit 44 includes a first power management unit 441 and a second power management unit 442. The first power management unit 441 controls whether the circuit included in the power control region 431 operates with first consumption power or operates with second consumption power which is lower than the first consumption power. The second processing unit 422 controls whether the circuit included in the power control region 432 operates with the first consumption power or operates with the second consumption power which is lower than the first consumption power. Note that the power management unit 441, 442 switches the consumption power of the circuit belonging to the power control region 431, 432 by making control such as cutting off the power of the circuit belonging to the power control region 431, 432 or changing or stopping a clock frequency to be supplied. In the following description, it is assumed that the power management unit 441, 442 controls the consumption power by switching between the cutoff and supply of the power to the power control region 431, 432.

The operation of the power management unit 44 is described hereinafter in further detail. The power management unit 441 switches the consumption power of the first processing unit 421 from the first consumption power to the second consumption power upon output of the power down control signal PD41 (for example, when it becomes enabled). Further, the power management unit 442 switches the consumption power of the second processing unit 422 from the first consumption power to the second consumption power upon output of the power down control signal PD42 (for example, when it becomes enabled). Then, the power management unit 441 switches the circuit at least including the first processing unit 421 from the second operating mode where it operates with the second consumption power to the first operating mode where it operates with the first consumption power in response to a second return instruction signal RTN41. Further, the power management unit 442 switches the circuit at least including the second processing unit 422 from the second operating mode where it operates with the second consumption power to the first operating mode where it operates with the first consumption power in response to a first return instruction signal RTN42.

When switching the consumption power of the power control region 431 from the first consumption power to the second consumption power, the power management unit 441 enables a power control signal PC41, and when switching it from the second consumption power to the first consumption power, the power management unit 441 disables the power control signal PC41. Further, when switching the consumption power of the power control region 432 from the first consumption power to the second consumption power, the power management unit 442 enables a power control signal PC42, and when switching it from the second consumption power to the first consumption power, the power management unit 442 disables the power control signal PC42.

The monitoring unit 45 is the same circuit as the monitoring unit 15 according to the first embodiment. However, in the semiconductor device 40, because the interface unit 41 also generates the return instruction signal, the return instruction signal RTN42 that is generated by the monitoring unit 45 is referred to hereinafter as the first return instruction signal RTN42 for differentiation.

<Description of Operation of Semiconductor Device According to Third Embodiment>

Figure 11:
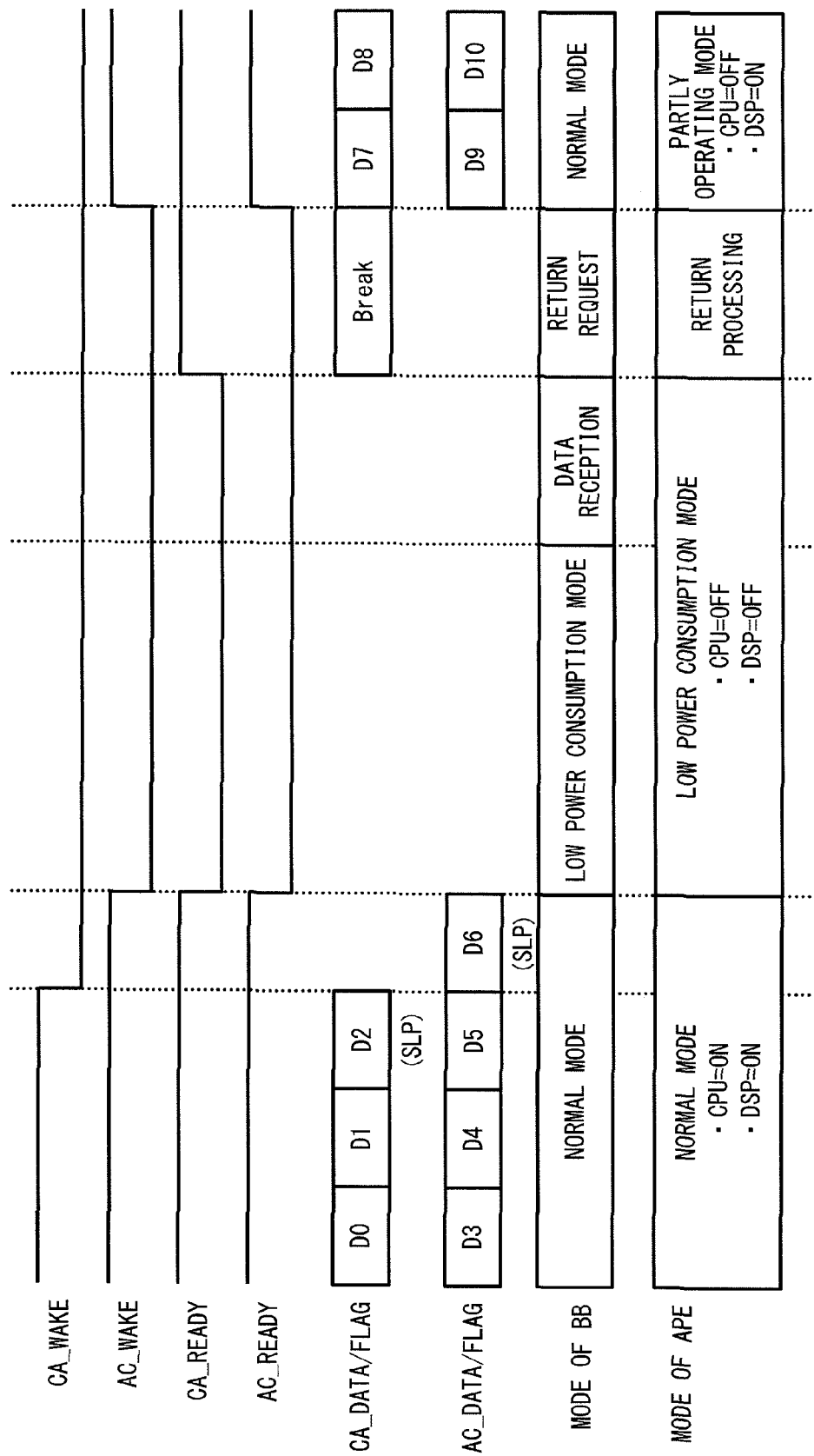
FIG. 11 is a timing chart showing an operation of a first switching mode of the inter-circuit communication system including the semiconductor device according to the third embodiment.
Figure 12:
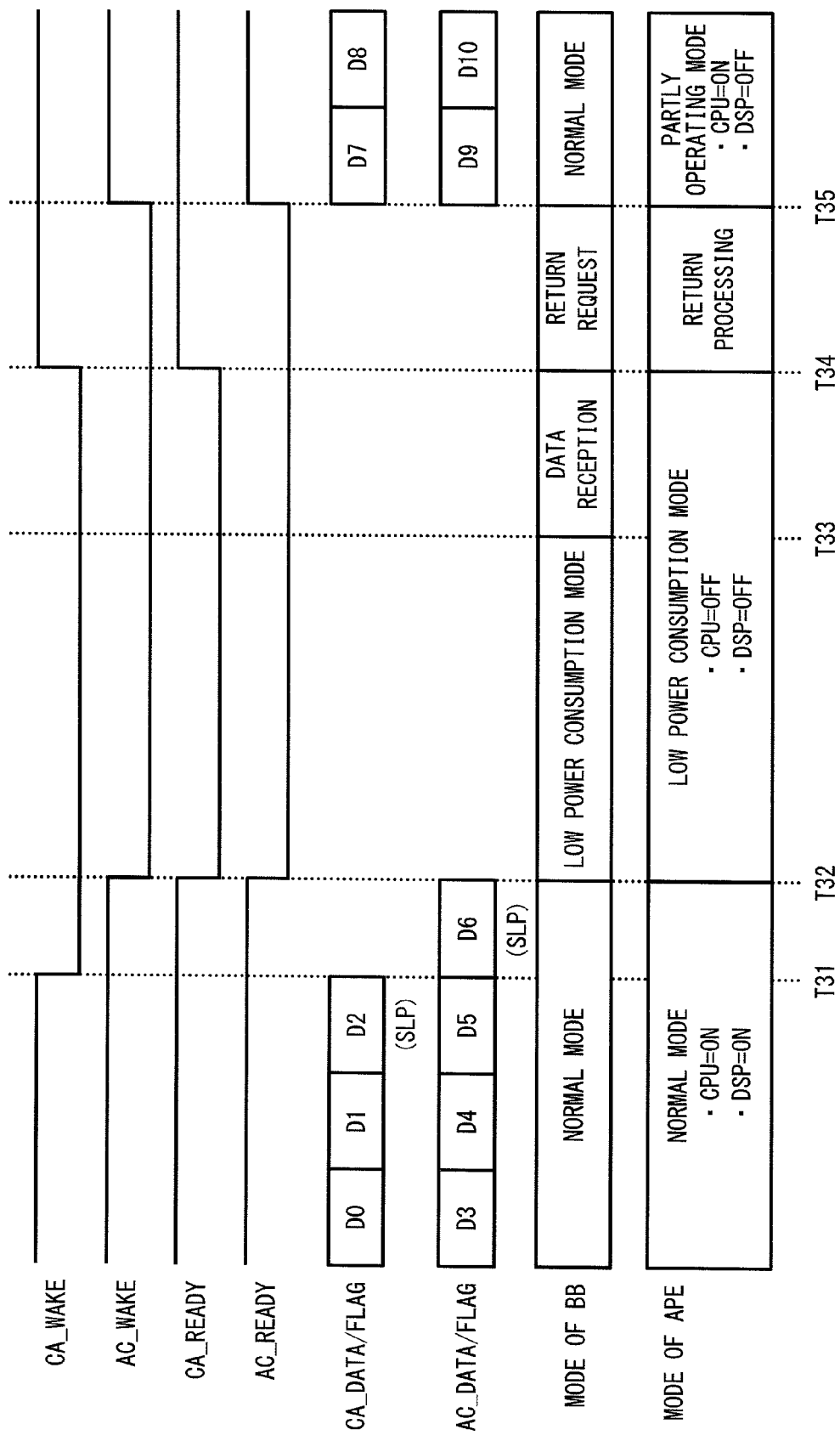
FIG. 12 is a timing chart showing an operation of a second switching mode of the inter-circuit communication system including the semiconductor device according to the third embodiment.

The operation in the inter-circuit communication system that includes the semiconductor device 40 according to the third embodiment is described hereinafter. FIGS. 11 and 12 are timing charts showing the operation of the inter-circuit communication system including the semiconductor device 40 according to the third embodiment. Note that the timing chart of FIG. 11 shows the case of performing the operation that allows only the second processing unit 422 including a DSP to return as return processing. The timing chart of FIG. 12 shows the case of performing the operation that allows only the first processing unit 421 including a CPU to return as return processing.

As shown in FIG. 11, the process to transition to the low power consumption mode (process of timing T21 to T23) in the inter-circuit communication system according to the third embodiment is the same as the process in the inter-circuit communication system according to the first embodiment. Note that, in the semiconductor device 40 according to the third embodiment, upon receiving the sleep permission frame SLP, the sleep permission notification is given to the first processing unit 421 and the second processing unit 422, allowing the two processing units to enter the low power consumption mode.

Then, at timing T23, when the semiconductor device 20 returns from the low power consumption mode upon receiving data from an RF subsystem, for example. At timing T24, the semiconductor device 20 transmits the break transmission command as a return request. At this time, the semiconductor device 20 enables the transmission permission signal CA_READY.

Further, at timing T24, in the semiconductor device 40 that has received the break transmission command, the monitoring unit 45 enables the first return instruction signal RTN42, and the power management unit 44 disables the power control signal PC42. The semiconductor device 40 thereby allows only the second processing unit 422 including the DSP to transition from the low power consumption mode to the normal mode.

Then, at timing T25, the semiconductor device 40 enables the wakeup signal AC_WAKE to transmit data supplied from the second processing unit 422 and also enables the transmission permission signal AC_READY. The semiconductor device 40 thereby starts data transmission. Further, at timing T25, the semiconductor device 20 starts data transmission in response that the transmission permission signal AC_READY becomes enabled.

In the timing chart shown in FIG. 12 also, the process to transition to the low power consumption mode (process of timing T31 to T33) in the inter-circuit communication system according to the third embodiment is the same as the process in the inter-circuit communication system according to the first embodiment.

Then, at timing T33, when the semiconductor device 20 returns from the low power consumption mode upon receiving data from an RF subsystem, for example. At timing T34, the semiconductor device 20 enables the wakeup signal CA_WAKE as a return request. At this time, the semiconductor device 20 enables the transmission permission signal CA_READY.

Further, at timing T34, the interface unit 41 in the semiconductor device 40 enables the second return instruction signal RTN41 in response that the wakeup signal CA_WAKE becomes enabled, and the power management unit 44 disables the power control signal PC41. The semiconductor device 40 thereby allows only the first processing unit 421 including the CPU to transition from the low power consumption mode to the normal mode.

Then, at timing T35, the semiconductor device 40 enables the wakeup signal AC_WAKE to transmit data supplied from the first processing unit 421 and also enables the transmission permission signal AC_READY. The semiconductor device 40 thereby starts data transmission. Further, at timing T35, the semiconductor device 20 starts data transmission in response that the transmission permission signal AC_READY becomes enabled.

<Advantage of Semiconductor Device According to Third Embodiment>

As described above, the semiconductor device 40 according to the third embodiment can select the way power returns in accordance with the type of the signal transmitted from the semiconductor device 20. The wakeup signal CA_WAKE that is transmitted from the semiconductor device 20 is a signal defined by the MIPI HSI specification or the like. Thus, the semiconductor device 40 according to the third embodiment can have a larger number of return modes than the number of return modes conceivable from the specification by using a signal defined by the specification. Further, with use of the semiconductor device 40, the number of signal lines does not increase with an increase in the number of return modes. Thus, by using the semiconductor device 40 according to the third embodiment, it is possible to increase the number of return modes without increasing the number of signal lines.

Further, the semiconductor device 40 according to the third embodiment can select a circuit block to be returned in accordance with the return mode. Thus, the semiconductor device 40 according to the third embodiment allows only a circuit block required for processing to return and an unnecessary circuit block to remain in the low power consumption mode. By such control, the semiconductor device 40 according to the third embodiment can reduce the wasteful power consumption.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

For example, the circuit of the monitoring unit shown in FIG. 4 is just an example and may be altered as appropriate in accordance with a command to be detected.

Furthermore, it is noted that, Applicant's intent is to encompass equivalents of all claim elements, even if amended later during prosecution.

What is claimed is:

1. A semiconductor device that switches consumption power between a first consumption power and a second consumption power lower than the first consumption power, the semiconductor device comprising:
   a transmission/reception interface that transmits and receives data via respective signal lines;
   a processing unit comprising circuitry that processes the data;
   a monitoring unit that is connected to monitor one or more of the signal lines, and comprising circuitry that detects whether a specific frame is received via the one or more signal lines when the consumption power of the transmission/reception interface is set to the second consumption power and is in a non-operation state with respect to an input signal via the one or more of the signal lines and that outputs a first return instruction signal when the specific frame is detected; and
   a power management unit comprising circuitry that switches the consumption power of the transmission/reception interface and the processing unit from the second consumption power to the first consumption power in response to the first return instruction signal,
   wherein the monitoring unit comprises an ExOr circuit, a counter, and a threshold determination circuit,
   a pair of the signal lines is connected to respective inputs of the ExOr circuit,
   said counter increments in value based on a level of one of the pair signal lines input to said counter and an output signal of the ExOr circuit input to said counter, and
   the threshold determination circuit generates the first return instruction signal when the value of the counter exceeds a predetermined threshold.

2. The semiconductor device according to claim 1, wherein
   the transmission/reception interface outputs a sleep permission notification to the processing unit upon receiving a sleep permission frame permitting transition to a stop mode as the data,
   the processing unit outputs a power down control signal to the power management unit based on the sleep permission notification output from the transmission/reception interface, and
   the power management unit switches the consumption power of the processing unit from the first consumption power to the second consumption power in response to the power down control signal.

3. The semiconductor device according to claim 2, wherein the power management unit switches the consumption power of the transmission/reception interface from the first consumption power to the second consumption power based on the power down control signal.

4. The semiconductor device according to claim 1, wherein
the processing unit includes a first processing unit and a second processing unit,
the transmission/reception interface outputs a sleep permission notification to the first processing unit and the second processing unit upon receiving a sleep permission frame permitting transition to a stop mode as the data,
each of the first processing unit and the second processing unit outputs a power down control signal to the power management unit based on the sleep permission notification, and
the power management unit switches the consumption power of the first processing unit and the second processing unit from the first consumption power to the second consumption power in response to the power down control signals.

5. The semiconductor device according to claim 4, wherein
the transmission/reception interface outputs a second return instruction signal to the power management unit upon receiving a wakeup signal, and
the power management unit switches consumption power of the first processing unit from the second consumption power to the first consumption power based on the second return instruction signal, and switches consumption power of the second processing unit from the second consumption power to the first consumption power based on the first return instruction signal.

6. The semiconductor device according to claim 1, wherein, in the specific frame, the same value continues for a longer data length than in a frame containing the data.

7. The semiconductor device according to claim 6, wherein the specific frame is a break transmission command that is defined by HSI specification based on MIPI Alliance and restores synchronization of the data.

8. The semiconductor device according to claim 1, wherein
the data contains a data signal and a flag signal having a value to generate a clock signal as a result of exclusive OR operation with a value of the data signal, and
the monitoring unit detects the specific frame by determining a period where the same value continues as the data based on the clock signal.

9. A mobile communication terminal that switches consumption power between a first consumption power and a second consumption power lower than the first consumption power, the mobile communication terminal comprising:
a first circuit; and
a second circuit,
wherein each of the first circuit and the second circuit includes:
a transmission/reception interface that transmits and receives data via respective signal lines; and
a processing unit comprising circuitry that processes the data, and
wherein at least one of the first circuit and the second circuit includes:
a monitoring unit that is connected to monitor one or more of the signal lines, and comprising circuitry that detects whether a specific frame is received via the one or more signal lines when the consumption power of the transmission/reception interface is set to the second consumption power and is in a non-operation state with respect to an input signal via the one or more of the signal lines and that outputs a first return instruction signal when the specific frame is detected; and
a power management unit comprising circuitry that switches the consumption power of the transmission/reception interface and the processing unit from the second consumption power to the first consumption power in response to the first return instruction signal,
wherein the monitoring unit comprises an ExOr circuit, a counter, and a threshold determination circuit,
a pair of the signal lines is connected to respective inputs of the ExOr circuit,
said counter increments in value based on a level of one of the pair signal lines input to said counter and an output signal of the ExOr circuit input to said counter, and
the threshold determination circuit generates the first return instruction signal when the value of the counter exceeds a predetermined threshold.

10. The mobile communication terminal according to claim 9, wherein the first circuit and the second circuit are formed on different semiconductor substrates.

11. The mobile communication terminal according to claim 9, wherein the first circuit is an application processor that reads a program stored in a memory incorporated in the mobile communication terminal and performs processing for implementing functions of the mobile communication terminal, and the second circuit is a baseband processor that performs baseband processing including encoding or decoding of data transmitted or received by the mobile communication terminal.

12. An inter-circuit communication system that switches consumption power between a first consumption power and a second consumption power lower than the first consumption power, the inter-circuit communication system comprising:
a first circuit; and
a second circuit,
wherein each of the first circuit and the second circuit includes:
a transmission/reception interface that transmits and receives data via respective signal lines; and
a processing unit comprising circuitry that processes the data, and
wherein at least one of the first circuit and the second circuit includes:
a monitoring unit that is connected to monitor one or more of the signal lines, and comprising circuitry that detects whether a specific frame is received via the one or more signal lines when the consumption power of the transmission/reception interface is set to the second consumption power and is in a non-operation state with respect to an input signal via the one or more of the signal lines and that outputs a first return instruction signal when the specific frame is detected; and
a power management unit comprising circuitry that switches the consumption power of the transmission/reception interface and the processing unit from the second consumption power to the first consumption power in response to the first return instruction signal,
wherein the monitoring unit comprises an ExOr circuit, a counter, and a threshold determination circuit,
a pair of the signal lines is connected to respective inputs of the ExOr circuit, said counter increments in value based on a level of one of the pair signal lines input to said counter and an output signal of the ExOr circuit input to said counter, and the threshold determination circuit generates the first return instruction signal when the value of the counter exceeds a predetermined threshold.

13. A semiconductor device that switches consumption power between a first consumption power and a second consumption power lower than the first consumption power, the semiconductor device comprising:

a transmission/reception interface that transmits and receives data via respective signal lines;

a processing unit comprising circuitry that processes the data;

a monitoring unit that is connected to monitor one or more of the signal lines, and comprising circuitry that detects whether a specific frame is received via the one or more signal lines when the consumption power of the transmission/reception interface is set to the second consumption power and is in a non-operation state with respect to an input signal via the one or more of the signal lines and that outputs a first return instruction signal when the specific frame is detected; and a power management unit comprising circuitry that switches the consumption power of the transmission/reception interface and the processing unit from the second consumption power to the first consumption power in response to the first return instruction signal, wherein:

the one or more signal lines monitored by the monitoring unit comprise first and second input signal lines, the monitoring unit comprises an ExOr circuit, an inverter, a first counter, a second counter, and a threshold determination circuit, the first input signal line is coupled to a first input of the ExOr circuit, a first input of the first counter, and a first input of the second counter, the second input signal line is coupled to a second input of the ExOr circuit, an output of the ExOr circuit is coupled to a second input of the first counter and an input of the inverter, an output of the inverter is coupled to a second input of the second counter, and outputs of the first and second counters are coupled to respective inputs of the threshold determination circuit.

* * * * *